United States Patent [19]

Davis, Jr.

[11] 4,024,994

[45] * May 24, 1977

[54] POWER OPERATED CAULKING GUN

[76] Inventor: George B. Davis, Jr., 7512 Marbury Road, Bethesda, Md. 20034

[ * ] Notice: The portion of the term of this patent subsequent to June 8, 1993, has been disclaimed.

[22] Filed: Jan. 20, 1976

[21] Appl. No.: 650,627

Related U.S. Application Data

[63] Continuation-in-part of Ser. No. 611,548, Sept. 8, 1975, which is a continuation-in-part of Ser. No. 446,961, Feb. 28, 1975, Pat. No. 3,913,799.

[52] U.S. Cl. .............................. 222/326; 222/333; 222/390
[51] Int. Cl.² ......................................... B67D 5/46
[58] Field of Search ......................... 222/325–327, 222/333, 390; 74/424.8 A; 64/30 C, 30 A, 30 R

[56] References Cited

UNITED STATES PATENTS

| | | | |
|---|---|---|---|
| 647,765 | 4/1900 | Schulz | 74/424.8 A X |
| 1,829,789 | 11/1931 | Dammeter | 222/333 |
| 2,294,745 | 9/1942 | Goetz | 74/424.8 A |
| 3,208,638 | 9/1965 | Frenzel et al. | 222/390 X |
| 3,861,567 | 1/1975 | Davis, Jr. | 222/333 |

Primary Examiner—Robert B. Reeves
Assistant Examiner—Charles A. Marmor

[57] ABSTRACT

This invention relates to a hand held electric caulking gun wherein a caulk-driving piston is forced through the caulk-retaining receptacle of the gun in a manner to force caulking from the gun with considerable force and at a continuous easy-to-control flow. The gun includes a clutch for drivably disengaging the drive source from the piston should the reacting force against the caulk driving end of the piston exceed a predetermined value and a releasing device for allowing the piston to be disengaged of its drive linkage for allowing manual movement of the piston through the gun.

22 Claims, 7 Drawing Figures

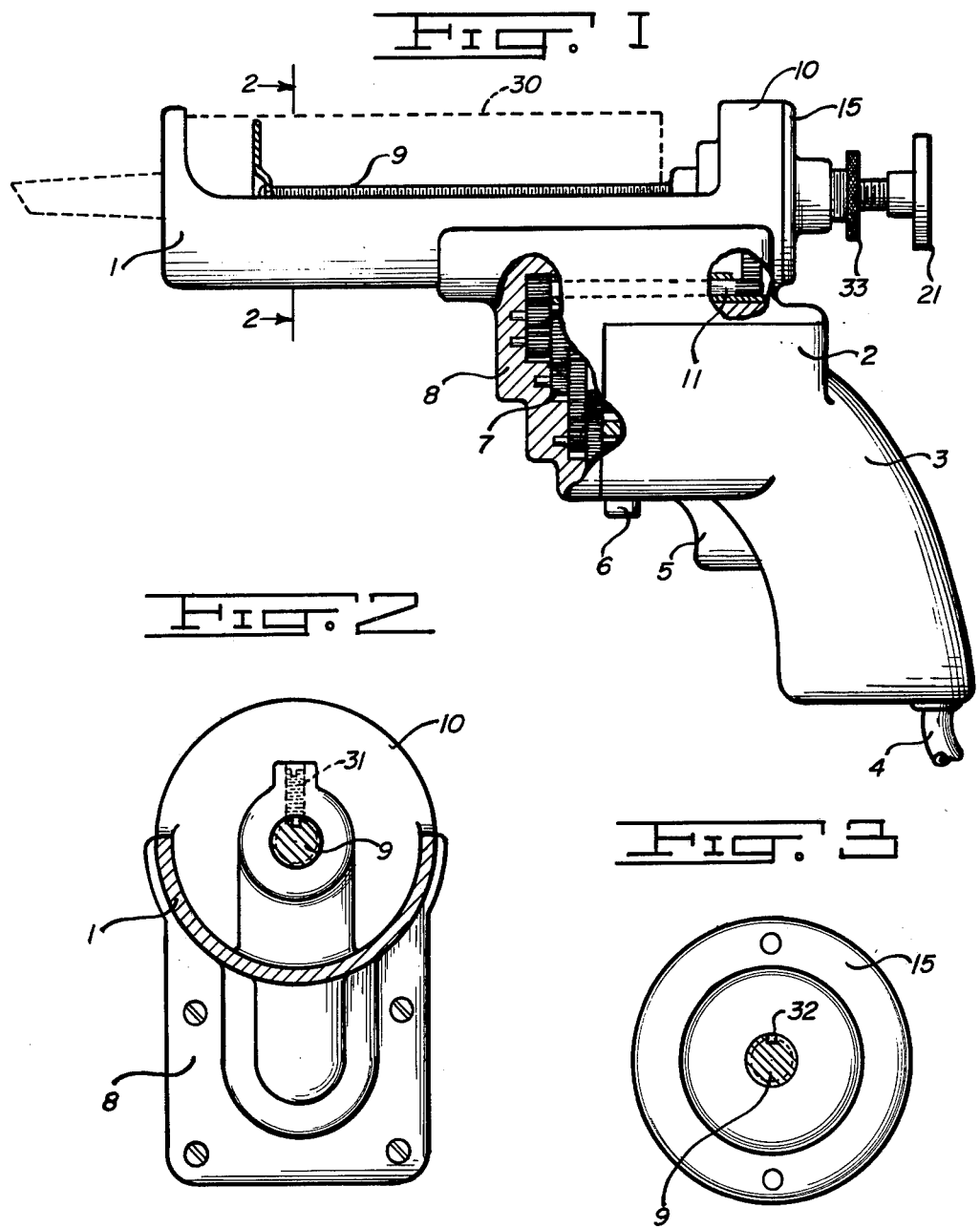

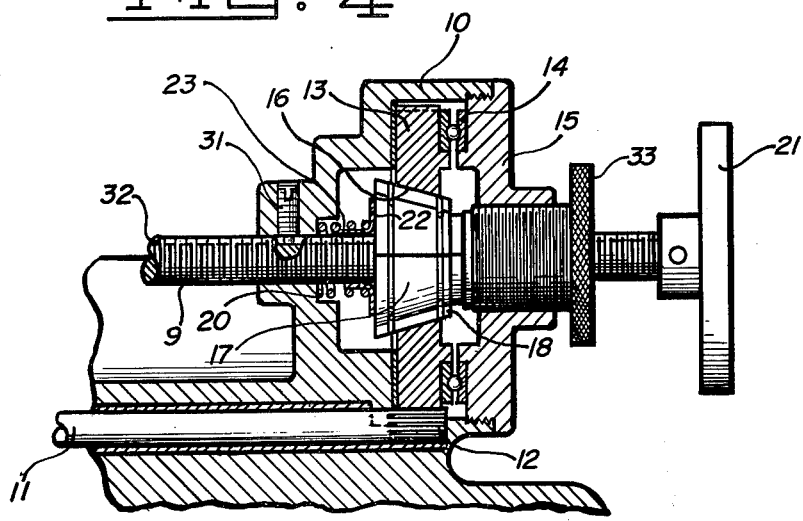
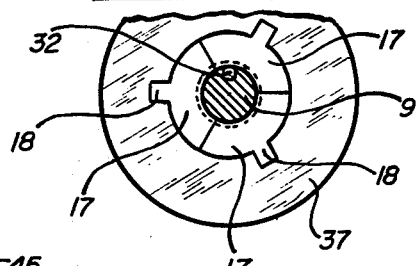
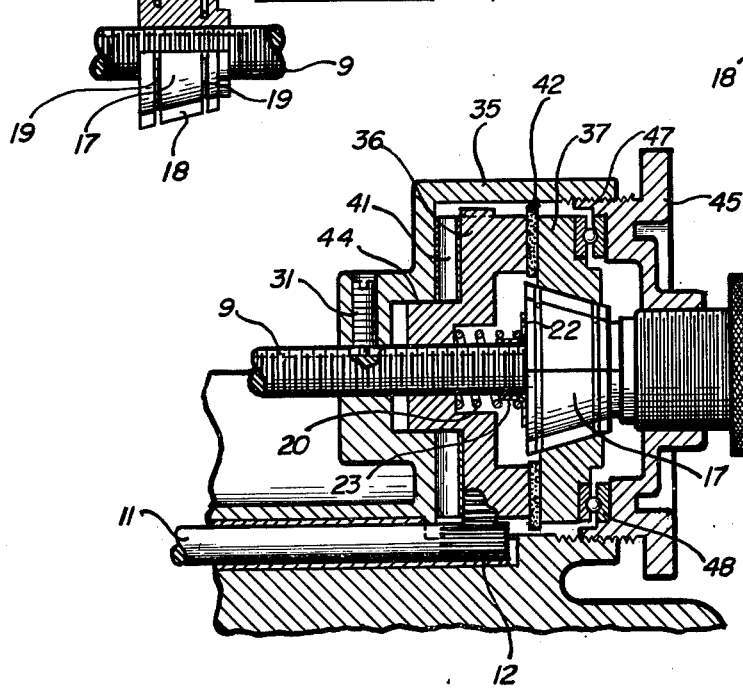

POWER OPERATED CAULKING GUN

This application is a continuation-in-part of now pending application Ser. No. 611,548 filed Sept. 8, 1975; which was a continuation-in-part of application Ser. No. 446,961 filed Feb. 28, 1975 now issued U.S. Pat. No. 3,913,799.

Caulking guns are well known in the art and are designed primarily for dispensing caulking that comes prepackaged within a cylindrical-like container or cartridge having projecting therefrom a dispensing nozzle through which the caulking is forced during the caulking operation. These guns include a receptacle wherein is received the cartridge with means being provided for driving a piston-like member through the cartridge thusly forcing the caulking from the nozzle.

Generally the piston of such apparatus is driven by variously constructed hand operated leverage mechanisms which serve to multiply the force applied, to more easily urge the piston through the cartridge. It is well known, however, that even with the mechanical advantage offered by such force multiplying mechanisms the effort required to drive the piston is considerable and frequently beyond the gripping capability of many, particularly the aged or those crippled as with arthritis or the like. Yet in many instances the very livelihood of such individuals with trades such as painters, boatmen and general home repairmen depend upon operating such caulking guns.

It is the primary object of the present invention to provide an electric hand-held type caulking gun wherein the power required to drive the piston through the gun is applied by means of an electric motor which, by the closing of an electric switch, will enable even a child to dispense caulking of the most viscous composition and in a continuous, easy-to-control flow, and in a manner unobtainable with conventional hand operated apparatus of this type.

It is a further object to provide a caulking gun of the type herein described wherein upon emptying of the caulking cartridge or upon any other form of interrupted forward movement of the driven piston, a clutching mechanism disengages the driving mechanism from the piston thereby preventing damage to the driving train mechanism of the device.

A still further object is to provide an electric caulking gun wherein the electric drive includes a variable speed control that will allow fast or slow dispensing of the caulking from the caulking cartridge as desired.

A further object is to provide an electric caulking gun including quick disengagement of the drive linkage from the piston after emptying of the cartridge thereby allowing the piston to be freed of the drive linkage to allow the piston to be manually movable through the gun.

Another object is to provide an electric caulking gun which, when in operation, dispenses the caulking from the gun with considerable force and in a manner to more positively penetrate such cracks and crevices into which the caulking is intended to flow and in a manner totally unobtainable by hand operated apparatus.

It is further desired to provide an electric hand-held caulking gun rugged in construction for professional use yet relatively inexpensive to produce.

Other objects and advantages will become more apparent when referring to accompanying description and drawings wherein:

FIG. 1 is a plan view partly cut-away of the assembled device of the invention.

FIG. 2 is a cross-sectional view through the gun receptacle and showing in elevation the gear housing cover of the device.

FIG. 3 is a fragmentary rear view of the caulking gun assembly.

FIG. 4 is a fragmentary view partly in elevation of the rear housing showing in elevation one form of the mechanism of the device.

FIG. 5 is a fragmentary view partly in elevation and partly in cross-section of an alternate form of the mechanism of the device including a slippable clutch.

FIG. 6 is a rear plan view of the segmented nut as assembled within the clamping member forming a part of the drive train of the device of FIG. 5.

FIG. 7 is a fragmentary view partly in section of the segmented nut as clamped about the threaded surface of the piston.

Referring now to FIG. 1, the device of the present invention is shown as comprised of a caulking cartridge receptacle 1 as mounted upon and secured to the drive mechanism of the device. The motor drive of the mechanism is contained within the housing 2 included as part of the handle 3 with power being supplied to the motor by way of the supply cord 4. A trigger 5 operates an internal variable speed control for the motor. The control may be of any suitable type such as commonly including such solid state elements as an SCR or TRIAC and DIC and/or the like and wherein manual operation of trigger 5 effects resistance changes in the gaiting circuit resistor that controls the duty-cycle output of the variable speed unit and consequently the speed of the motor connected therewith. The motor circuit further includes a reversing switch wherein by depressing the switch button 6 current to the armature of the motor is reversed to effect a reverse direction of rotation of the motor and drive mechanism of the gun.

Operation of the motor drives the gear train of the device of which a portion thereof is shown as enclosed within the forward housing 8. The gear train reduces the motor speed to that required to drive piston 9 through the gun at approximately 1 to 1½ inches per minute with a slower rate of piston movement being regulated by the variable speed control and as determined by the pressure applied to trigger 5 by the operator. With a slippable clutch mechanism within the drive train, as will later be described, and as used in combination with a variable speed control as incorporated with the present device, will enable the operator to dispense caulking of any usable viscosity and at any pressure desired at a continuous easy to control flow.

Referring now to FIG. 4 wherein is shown in section the housing 10 as enclosed the piston controlling mechanism of the gun. Extending into the housing is shaft 11 upon which is formed gear 12 with the shaft operating to deliver power from the power source and forward gear portion of the drive train to a clamp-gear 13 disposed for journaling within the housing 10 and as held in position by bearing 14 and cover plate 15.

Centrally formed within gear 13 is a tapered recess 16 within which, during operation of the device, is clamped a segmented tapered nut 17. Extending radially outward from each of the nut segment is a flange 18 that engages in driving relation simialarly formed grooves provided therefor within the gear 13 and as shown to advantage in FIG. 6. The segments of nut 17 are maintained in position with respect to each other by means of encircling ring-springs 19 that rest within closely fitting grooves provided therefor about the nut as shown in FIG. 7. The arrangement of the springs about the nut as shown, allows radial separation of the nut segments while preventing any independent axial shifting of the segments that could effect misalignment of the internal threads of the nut.

The spring retaining grooves about the nut shall be of a sufficient depth as to prevent the springs extending outward beyond the tapered surface of the nut to prevent proper clamping of the nut within recess 16.

Positioned over the piston 9 and between the large end of the tapered nut 17 and housing 10, is a spring 20 that is guided over the piston by a tubular sleeve 23 from which extends a radial flange 22. This flange provides a bearing surface between the end of the spring and nut as the spring yieldably maintains the nut in its clamped position within the tapered recess 16.

The surface of piston 9 is suitably threaded for meshing with the internal threads of nut 17 whereby forward rotation of the nut, as effected by forward rotation of clamp-gear 13 and as driven by the drive train and power source of the device, causes movement of the piston through the gun as required to force caulking from cartridge 30 under high pressure and at a continuous easy to control flow. The piston 9 is prevented from rotating with the nut 17 by means of a stud screw 31 of which the stud thereof engages a longitudinal groove 32 provided therefore within the piston as shown.

It shall be understood that when reference is made herein to forward rotation of a part, it is to be interpreted to mean the direction the part is rotated to effect forward movement of the piston through the receptacle or as required to force caulking from the gun. When reference is made to reverse rotation it shall be understood to mean the direction a part is rotated to effect the withdrawal or retraction of the piston from the receptacle.

When operating the gun as thus far described and with the piston of the gun fully retracted, a caulking cartridge, such as shown in FIG. 1 by 30, is first placed within the receptacle 1 of the gun. The piston 9 is then manually directed by knob 21 against the base of the cartridge. Manual movement of the piston in this manner is effected by the piston, in threaded mesh with nut 17, operating to carrying the nut outwardly from its clamped position within clampgear 13 and against spring 20 sufficiently as to allow the segments of the nut to separate thusly to allow the threads of the piston to slip by those of the nut until the piston reaches the base of the cartridge. With the piston now against the cartridge the drive is put in forward operation by pressure upon trigger 5 to cause movement of the piston through the cartridge to force caulking from the gun. Any misalignment of the threads of the nut with those upon the piston occurring at this time, will be corrected during the first forward rotation of nut 17 with the threads of the nut snapping into mesh with the threads upon the piston as the nut moves back into its clamped position within the tapered recess 16.

To manually retract the piston because of the piston having reached its most forwardly position, the drive train is momentarily reversed by pressing the drive reversing button 6 to effect movement of the piston. For the reason that more force is required to withdraw the piston from the cartridge than is required to depress spring 20, reversing of the drive will cause nut 17 to thread itself out upon the piston by compressing spring 20 and thusly from its clamped position within gear 13. Sufficient movement of the nut from the confines of recess 16, will allow the segments of the nut to separate allowing the nut to now rotate freely over the piston as driven by the motor. When this condition occurs the release member 33 is then manually rotated into the housing and against the small end of the nut 17 to maintain the nut free of the piston allowing the piston to be manually moved by knob 21 in either direction through the gun.

During such times as when the piston is not in a rigged and stopped position such as by being tightly against caulking within the cartridge, the piston may be freed of nut 17 by merely rotating the release member 33 inwardly against the small end of the nut to drive the nut from its clamped position within the clamp-gear 13. With the nut free of the recess 16, the piston may now be manually directed through the gun as desired.

Momentary pressing of the reversing button 6 will sufficiently retract the piston as to prevent further extrusion of caulking from the nozzle after releasing the trigger 5. For the reason previously described, the piston can only be retracted by reverse action of the drive, which is generally sufficient to stop continued caulking flow from the gun after releasing trigger 5. With the device of FIG. 5, and which is basically similar to the device of FIG. 4, there is provided within the drive train a slipping clutch that is selectively adjustable to assist in the regulation of caulking flow from the gun. Further the clutch provides a safety feature within the drive train that operates to prevent damage to the mechanism of the gun should the piston be suddenly and forcefully stopped during operation of the motor drive, or should the operator attempt to force old and setup caulking from the gun. Further, the clutch within the drive train so protects the components of the gun for overload and damage as to allow the housing 35, gear 36 and clamping member 37 to be molded from plastic which greatly reduces the cost of the gun in addition to reducing its weight.

The mechanism of the gun of FIG. 5 is driven by the drive shaft 11 that, as in FIG. 4, forms a part of the drive linkage between the motor drive and piston 9. the gear 12 formed upon shaft 11 is positioned for engaging in driving relation the gear 36 disposed for journaling within the housing as at 40 and rotatable freely about the piston. Interpositioned between gear 36 and the clamping member 37 is a fiberous composition washer 42 that serves in operation to frictionally communicate rotary motion from gear 36 to the clamping member 37 and thusly to the piston driving nut 17. The degree of slip at the clutch is determined by the pressure applied to the clutch faces by the degree of compression of ring spring 44 interposed between the housing and gear 36. Clutch slippage is selectively adjustable by inward movement of a clutch adjustment ring 45 threaded within the housing 35 as at 47 and operative as it is rotated inwardly, to shift the clutch assembly forward as required to compress spring 44 and to more forcefuly press the faces of the clutch together. The bearing 48 positioned between the clamping member 37 and clutch adjustment ring 45, serves as a thrust bearing for the piston as forward motion of the piston forces caulking from the gun. A similar type bearing, such as 48 may be positioned between the spring 44 and gear 36 if so desired.

Since all moving parts within the housing 35, such as the gear 36 and clamping member 37, rotate at a relatively slow speed of approximately 32 RPMs, suitable sets of hardened steel washers may be used throughout the device as bearing surfaces in leu of the more expensive ball type bearing as shown by 48.

As in the device of FIG. 4 the spring 20 serves to yieldably maintain the tapered nut 17 within the confines of the tapered recess within the clamping member 37 and which forms a part of the drive train mechanism of the gun. The clamping member 37 when rotated by way of its frictional engagement with the clutch washer 42 effects rotation of nut 27 about the threaded surface of the piston as required to drive the piston through the gun. Release of the piston from nut 17 for permitting manual movement of the piston through the gun has hereinbefore been described.

While herein is shown and described two similar forms of the device, it is understood that many variations in the structure and design of the device may be resorted to without departing from the spirit and scope of the invention as herein disclosed.

What I therefor claim and desire to cover by letters patent is:

1. A hand held caulking gun including in combination, a receptacle for receiving therein a caulking cartridge having a caulk dispensing nozzle thereon, a threaded piston movable when driven through said receptacle to force the caulking from said cartridge by way of said nozzle, drive means for said piston including a tapered segmented nut disposed about the threaded surface of said piston with the larger end of said tapered nut pointing toward the caulk driving end of said piston, clamping means for clamping in driving relation the segments of said nut about the threaded surface of said piston and operative when rotated to effect rotation of said nut and movement of said piston through said receptacle, a power source, a speed reducing drive train drivably connecting said power source when said clamping means and operative to effect rotation of said nut by operation of said power source and clutch means interposed in said drive train between said power source and nut and operative to interrupt rotation of said nut upon a predetermined movement arresting force being applied to the caulk driving end of said piston during operation of said power source.

2. A caulking gun as claimed in claim 1 wherein said clamping means includes a tapered recess forming a part of said drive train.

3. A caulking gun as claimed in claim 2 including means movable for forcing said tapered nut from said tapered recess and from its clamped position about said piston to allow manual movement of said piston through said nut.

4. A caulking gun as claimed in claim 2 wherein said tapered recess and tapered nut includes drive communicating surfaces.

5. A caulking gun as claimed in claim 1 wherein spring means yieldably maintains said tapered nut in clamped position within said recess and in driving relation with said piston.

6. A caulking gun as claimed in claim 1 wherein said power source is a variable speed electric motor.

7. A caulking gun as claimed in claim 1 wherein said power souce is a reversible electric motor.

8. A caulking gun as claimed in claim 1 wherein said clutch means is slippable.

9. A caulking gun as claimed in claim 1 wherein said clutch means is adjustable for slip.

10. A hand held caulking gun to be power driven including a receptacle for receiving therein a caulking cartridge having thereon a caulk dispensing nozzle, a threaded piston movable when driven through said cartridge to force the caulking from said cartridge by way of said nozzle, drive means for said piston including a tapered segmented nut disposed about said piston with the larger end of said tapered nut pointed toward the caulk driving end of said piston and operable when clamped about the threaded surface of said piston and rotated to effect movement of said piston through said cartridge, a power source, a speed reducing drive train to be driven by said power source, clamping means for releasably clamping the segments of said nut in driving relation about the threaded surface of said piston with at least a part of said nut clamping means forming a part of said drive train and clutch means interposed in said drive train between said power source and said nut and operative to drivably disengage said nut from said power source upon a predetermined movement arresting pressure being applied to the caulk driving end of said piston during operation of said power source.

11. A caulking gun as claimed in claim 10 wherein said clutch means is slippable.

12. A caulking gun as claimed in claim 11 wherein said clutch means is adjustable for slip.

13. A caulking gun as claimed in claim 10 wherein the segments of said segmented nut are yieldably held together by encircling spring means.

14. A caulking gun as claimed in claim 10 wherein said clamping means and said tapered nut have drive communicating surfaces.

15. A caulking gun as claimed in claim 10 wherein said power source is a variable speed electric motor.

16. A caulking gun as claimed in claim 10 wherein the said power source is a reversible electric motor.

17. A hand held electric caulking gun including in combination, a receptacle for receiving therein a caulking cartridge having a caulk dispensing nozzle thereon, a threaded piston movable when driven through said cartridge to force caulking from said cartridge by way of said nozzle, driving means for said piston including a tapered segmented nut disposed about the threaded surface of said piston with the larger end of said tapered nut pointed toward the caulk driving end of said piston and operable when clamped about the threaded surface of said piston and rotated to effect movement of said piston through said cartridge, an electric motor, a speed reducing drive train drivably connecting said motor with said nut, clamping means forming a part of said drive train and including a tapered recess for receiving therein said tapered nut for clamping the segments of said nut in driving relation about the threaded surface of said piston and rotating said nut when driven by said motor, spring means disposed for yieldably maintaining the segments of said nut in clamped position within said recess and about the threaded surface of said piston, nut releasing means including means movable for forcing said nut from its clamped position within said recess for allowing separation of the nut segments from said piston to permit manual movement of the piston through the nut and slippable clutch means disposed in said drive train between said motor and nut and operable to drivably disengage said motor from said nut upon a predetermined movement arresting force being applied to the caulk driving end of said piston.

18. A caulking gun as claimed in claim 17 wherein said clutch means is adjustable.

19. A caulking gun as claimed in claim 17 wherein said tapered nut and tapered recess have drive communicating surfaces.

20. A caulking gun as claimed in claim 17 wherein the segments of said nut are yieldably held together by encircling spring means.

21. A caulking gun as claimed in claim 17 wherein said electric motor for driving the said speed reducing drive train is a variable speed electric motor.

22. A caulking gun as claimed in claim 17 wherein said electric motor for driving the said speed reducing drive train is a reversible electric motor.

* * * * *